(12) United States Patent
Day et al.

(10) Patent No.: US 8,826,409 B2
(45) Date of Patent: Sep. 2, 2014

(54) SECURE DIGITAL DOWNLOAD STORAGE DEVICE

(75) Inventors: Philip Noel Day, Fife (GB); James Henderson, Fife (GB); Andrew Colley, Dundee (GB)

(73) Assignee: NCR Corporation, Duluth, GA (US)

( * ) Notice: Subject to any disclaimer, the term of this patent is extended or adjusted under 35 U.S.C. 154(b) by 392 days.

(21) Appl. No.: 12/974,515

(22) Filed: Dec. 21, 2010

(65) Prior Publication Data

US 2012/0159185 A1 Jun. 21, 2012

(51) Int. Cl.
*G06F 7/04* (2006.01)
*H04L 29/06* (2006.01)
*G06F 11/30* (2006.01)

(52) U.S. Cl.
USPC ............. 726/9; 726/20; 726/21; 713/161; 713/165; 713/193

(58) Field of Classification Search
USPC ........... 713/193; 726/9, 20, 21, 161, 165, 193
See application file for complete search history.

(56) References Cited

U.S. PATENT DOCUMENTS

| 7,779,064 | B2 | 8/2010 | Phillips | |
|---|---|---|---|---|
| 8,069,380 | B2 * | 11/2011 | Murin et al. | 714/718 |
| 8,266,481 | B2 * | 9/2012 | Moshayedi | 714/710 |
| 8,327,051 | B2 * | 12/2012 | Kang | 710/74 |
| 2007/0061897 | A1 * | 3/2007 | Holtzman et al. | 726/34 |
| 2007/0169132 | A1 | 7/2007 | Blust et al. | |
| 2008/0005590 | A1 * | 1/2008 | Kasahara et al. | 713/193 |
| 2008/0162947 | A1 * | 7/2008 | Holtzman et al. | 713/193 |
| 2009/0172393 | A1 * | 7/2009 | Tanik et al. | 713/160 |
| 2009/0193153 | A1 * | 7/2009 | Thanos | 710/11 |
| 2010/0281110 | A1 | 11/2010 | Phillips | |

* cited by examiner

*Primary Examiner* — Mohammad W Reza
(74) *Attorney, Agent, or Firm* — Peter H. Priest; Joseph P. Mehrle

(57) ABSTRACT

A secure USB flash drive employing digital rights management to implement secure digital media storage such as that provided by encrypted storage utilizing content protection for recordable media (CPRM) or the like. Unlike a secure digital card which provides such protection, it does not need an SD card port which is CPRM enabled, or alternatively a reader adapted for use therewith. The form factor can be that of a standard USB flash drive and a standard USB connector is employed making the device and its use familiar and comfortable to the average consumer.

8 Claims, 6 Drawing Sheets

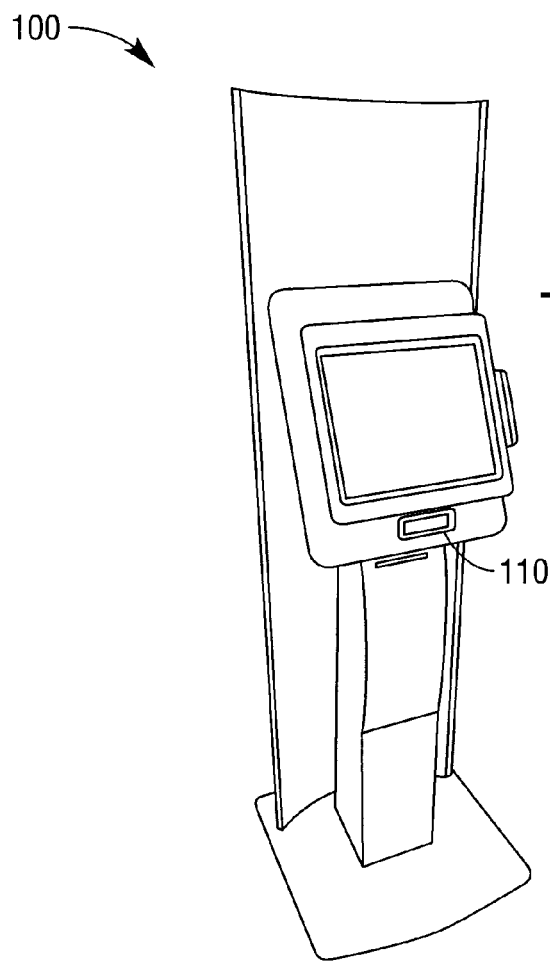
FIG. 1
PRIOR ART
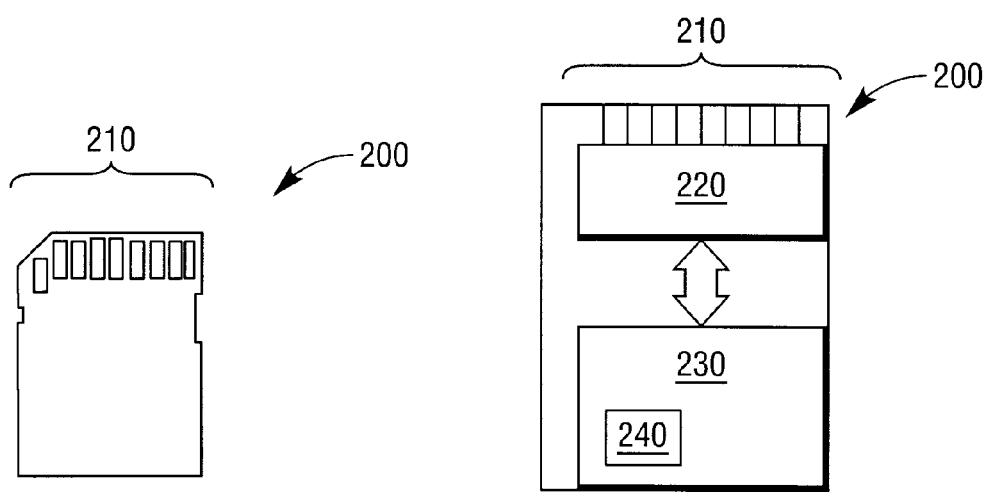
FIG. 2A
PRIOR ART
FIG. 2B
PRIOR ART

SECURE DIGITAL DOWNLOAD STORAGE DEVICE

RELATED APPLICATION

The subject matter of the present application is related to that of U.S. application Ser. No. 12/974,429 filed Dec. 21, 2010 [on even date] herewith, assigned to the assignee of the present application, entitled Digital Download Kiosk, and incorporated by reference herein in its entirety.

FIELD OF THE INVENTION

The present invention relates generally to improvements relative to the download and storage of digital media, such as movies, music, games, books and the like, and more particularly to an improved secure storage device comprising a secure universal serial bus (USB) flash drive employing digital rights management as addressed further herein.

BACKGROUND OF THE INVENTION

One current digital media download approach is based on secure digital (SD) cards as the primary media. A digital download kiosk 100 for use with such cards is illustrated in FIG. 1. To use the kiosk 100, a consumer inserts an SD card, such as card 200 illustrated in FIG. 2A into a connector 110 for receiving the card. The typical SD card measures 32×24× 2.1 mm. The flash card memories therein follow a non-volatile memory format developed by Panasonic, San Disk and Toshiba for use in portable devices such as digital cameras, mobile phones, video game consoles and the like. The SD card 200 employs a series of contacts 210. Digital rights management (DRM) protection can be embedded in the secure SD card 200 which can utilize the content protection for recordable media (CPRM) format to protect digital media stored in secure storage therein. FIG. 2B shows a block diagram of the card 200 including contacts 210, an SD controller 220 and flash memory 230 including a block of secure flash memory 240 for storing DRM credentials and encryption keys.

Digital download systems like the system of FIG. 1 have many advantages. For example, they provide the ability to offer a wide range of entertainment content without the challenges of transporting and stocking inventory, such as stocking a supply of DVDs or the like. Additionally, they allow the use of well established and accepted digital rights management, such as CPRM, which is widely employed in the secure digital card consumer electronics flash memory format. U.S. Pat. No. 7,779,064 describes details of distributing digitally encoded content, such as movies, music, computer games to kiosk-like content-delivery systems, such as kiosk 100, and is incorporated by reference herein in its entirety.

Solid state storage cards such as SD card 200 are a convenient and secure media for storing large amounts of data in a small form factor. However, inserting and removing the card in a self service, public environment, can be problematic. It is possible to insert a card incorrectly. In addition, although they are widely used in products such as cameras and mobile phones, they are usually used to expand the memory of such a device. Common usage is to insert the SD card into the device, and then leave it inside the device and access the card via the device often by means of the device's own USB port. The overall number of insert or retract cycles of such cards is relatively low and limited by the arrangement of the multiple contacts. Additionally, a wide variety of consumer electronic devices such as laptops include one or more USB ports, but do not include an SD card enabled port supporting access to the secure flash area of the card.

One solution is shown in FIG. 3A. That solution employs a separate reader module 300 for use in conjunction with the SD card 200 which is inserted therein. The reader module 300 employs a USB connector 350 represented schematically in FIG. 3A. FIG. 3B illustrates an alternative embodiment of an SD card and reader combination 375 employing a micro SD card 380 and reader 390 having the physical form of a common USB flash drive. This solution has its own issues requiring a consumer to keep track of both a small SD card and a small reader. If the two become separated, the user is out of luck. Also, the use of two separate items is costly, especially if a micro SD card is used as this format is typically obtained at a cost premium over standard SD, and offers slower performance.

SUMMARY of the INVENTION

Among its several aspects, the present invention recognizes several issues in the marketplace related to SD cards resulting in poor usability, high costs, incompatibilities and consumer confusion. The present invention also recognizes that a solution is required that offers comparable storage and importantly the security facilitated by a secure flash area, allowing the storage of DRM and encryption keys employed by SD cards and accepted by many content providers, but in a format that is easier to use, more familiar to consumers, supporting a higher duty cycle, and at a lower cost point.

According to one aspect of the invention, a single integrated consumer device is proposed that uses a standard and familiar USB connector, but which can be read or written to as if it was an SD card enabling current approaches for transferring media to the card to be utilized as discussed further herein. In one embodiment, a custom partitioned secure area within the flash memory of a USB drive offers the same functionality provided by an SD secure area and is accessed with a modified flash memory controller as addressed further below.

According to one aspect of the invention, a secure universal serial bus (USB) flash drive adapted for use in download and output of digital media comprises: a standard USB connector for receiving digital media to be downloaded; a flash memory including a block of secure storage; a modified USB flash memory controller for storing both digital media, and digital rights received through the standard USB connector in the and secure flash storage, respectively, utilizing digital rights management software, and for retrieving stored digital media from the flash and digital rights from secure flash storage for output on the standard USB connector.

A more complete understanding of the present invention, as well as further features and advantages of the invention, will be apparent from the following Detailed Description and the accompanying drawings.

BRIEF DESCRIPTION OF THE DRAWINGS

FIG. 1 shows a prior art digital download kiosk for downloading digital media such as movies, music and the like to an SD card;

FIGS. 2A and 2B illustrate aspects of prior art SD cards for use in conjunction with the kiosk of FIG. 1;

DETAILED DESCRIPTION

Figure 3A:
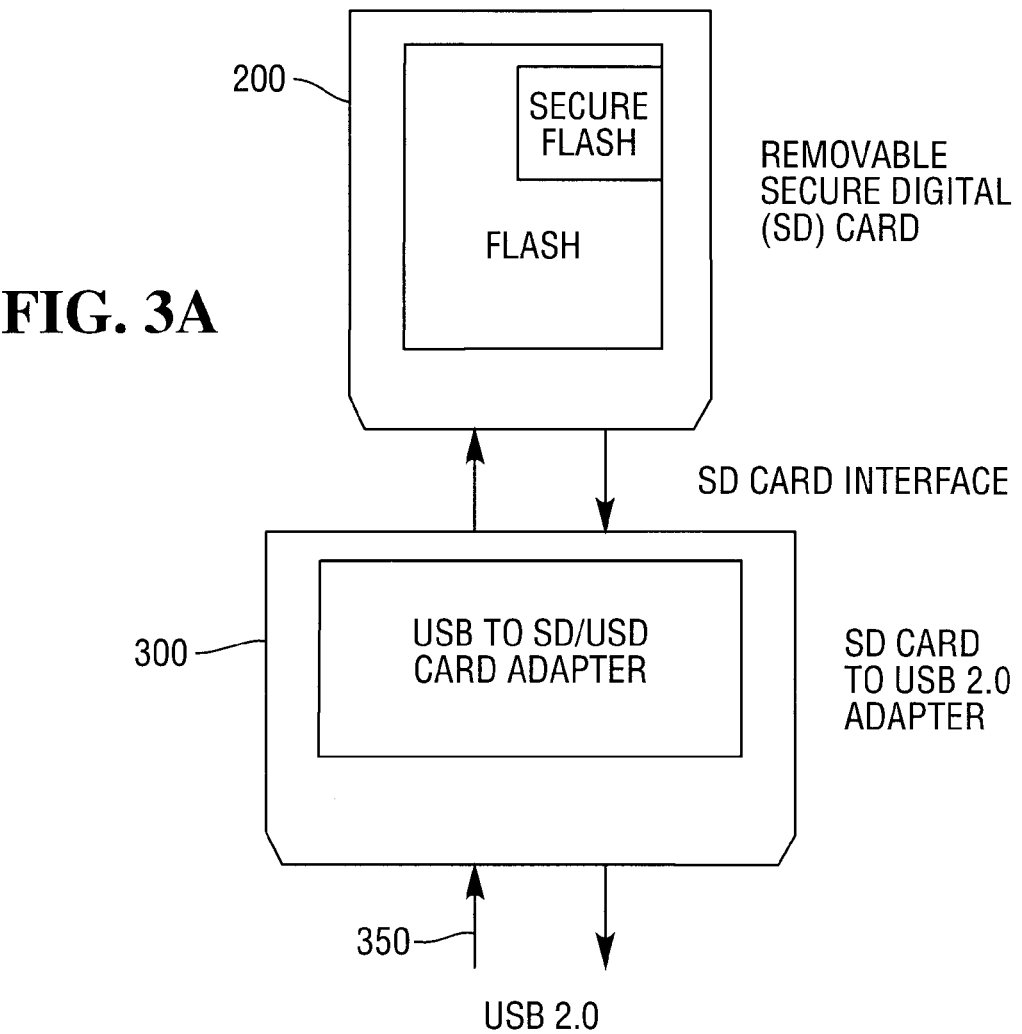
FIGS. 3A and 3B illustrate prior art secured digital card and reader adapter approaches.
Figure 3B:
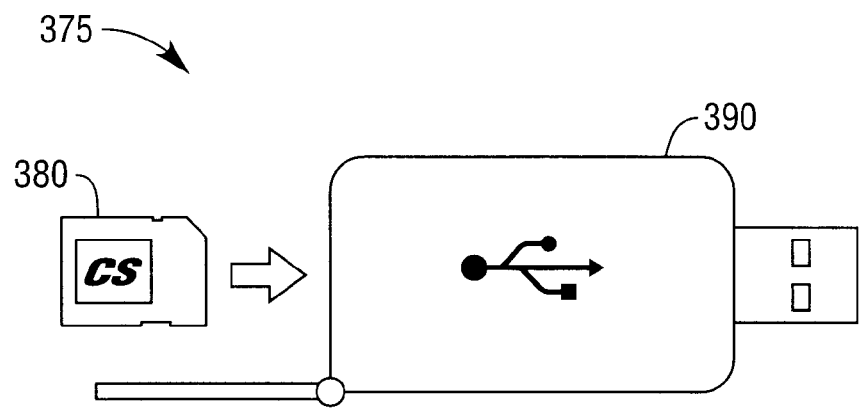

By contrast with an SD card, a USB flash drive consists of a flash memory data storage device integrated with a universal serial bus (USB) interface. The flash device consists of a small printed circuit board carrying a mass storage controller and a flash memory chip protected inside a case, and a USB connector. The device is very durable and can be carried in a pocket or on a key chain, for example. Such devices, however, do not provide the security of the SD card and do not have the ability to provide secure storage of digital rights or encryption keys. Accordingly, the present invention provides a secure USB flash drive device whose features may suitably include: a device footprint like that of standard USB flash drive for storing digital multimedia content such as movies, music, books, and games; the digital rights management (DRM) advantages and security advantages of an SD card, such as, CPRM; usability and familiarity advantages of using a standard USB connector rather than the more vulnerable SD or micro SD card contacts. The invention may be suitably implemented either by having micro SD flash memory embedded into a single packaged USB device, or a custom designed area within the flash memory of a USB flash device that acts like SD. If writing to the device is done "off-line", comparatively low speed and low cost flash memory may be utilized for secure storage thereby further reducing the cost of the device. The combined media and delivery transport requires only one device eliminating the need for both a specialized SD card and an SD card to USB adapter as shown in FIG. 3. Further, the use of SD cards requires CPRM enabled slots with compatible read and write capability to be in the consumer electronic devices one intends to use to view a movie, listen to music or play a game. There are many fewer of these CPRM enabled slots currently deployed in the marketplace when compared to the number of deployed USB ports. The device of the invention overcomes this significant market limitation.

Figure 4A:
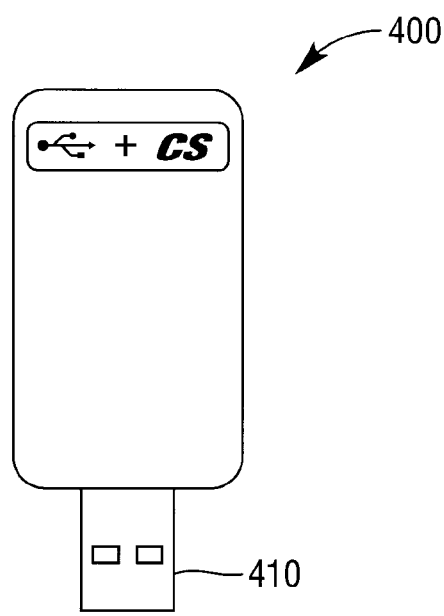
FIGS. 4A and 4B illustrate a secure USB flash drive providing a secure storage area for digital rights management, having a form factor similar to the standard USB flash drive familiar to consumers worldwide, and a block diagram of circuitry therefore, respectively, in accordance with the present invention.

FIG. 4A shows a first embodiment of a secure USB flash drive 400 according to the present invention. The secure USB flash drive 400 has a form factor similar to or the same as the standard USB flash drive which is familiar to users worldwide. Secure USB flash drive 400 employs a standard USB connector 410 compatible with the standard USB port employed by myriad consumer electronic devices which have such ports so that customer use in a device such as a laptop follows the familiar plug and play scenario.

Figure 4B:
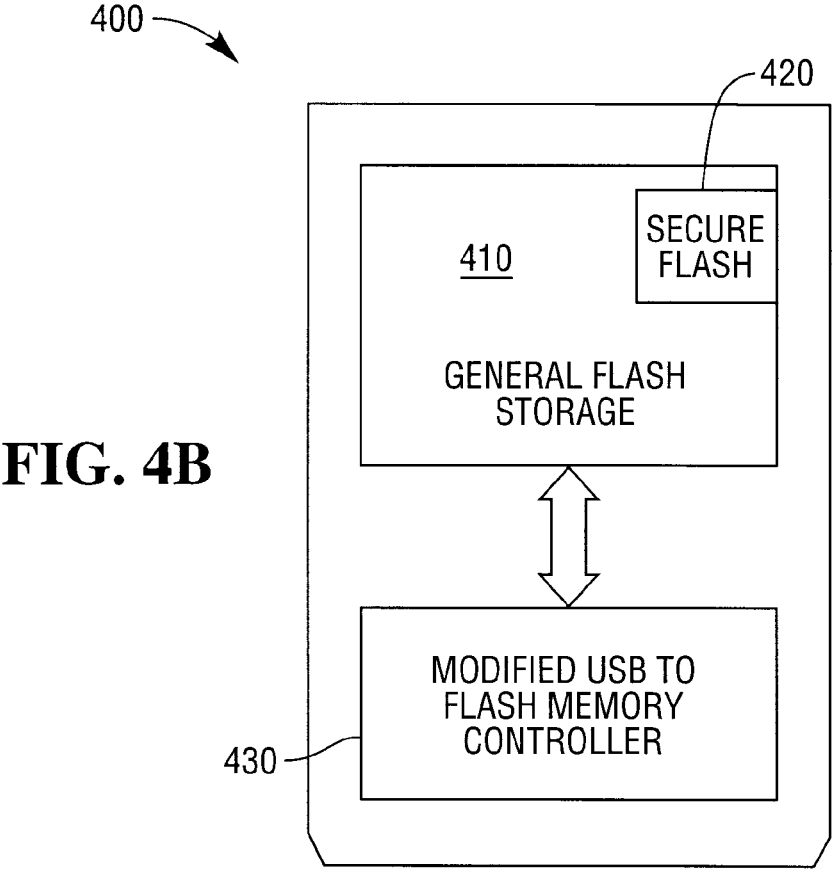

FIG. 4B shows a block diagram of the internal circuitry of the secure USB flash drive 400. This circuitry includes general flash storage 410, secure flash storage 420 for storing digital media, and a modified USB flash memory controller 430. In one embodiment, the secure flash storage 420 stores a master key corresponding to a master key stored by a kiosk or kiosks, or other download devices with which the secure USB flash drive 400 is to work. When it is desired to download a movie, for example, the authorized kiosk provides the master key to the modified USB flash memory controller 430 which retrieves the master key from secure storage and upon a match allows access to the secure storage to the kiosk. The kiosk may then suitably store the movie to flash memory and digital rights authorization keys to secure storage allowing a renter to have access as defined by these further keys. For example, the keys might allow the user to view the movie on one or two devices, to begin viewing within thirty days, and one viewing had begun to view the movie for up to 48 hours. Thus, once a user has downloaded and paid for a movie, he or she can plug device 400 into a USB connector of a device, such as a laptop, to watch the movie. The controller provides the keys to the laptop allowing it access as discussed above. ISB flash drive 400 may suitably operate as discussed further below in connection with FIG. 7.

Figure 5A:
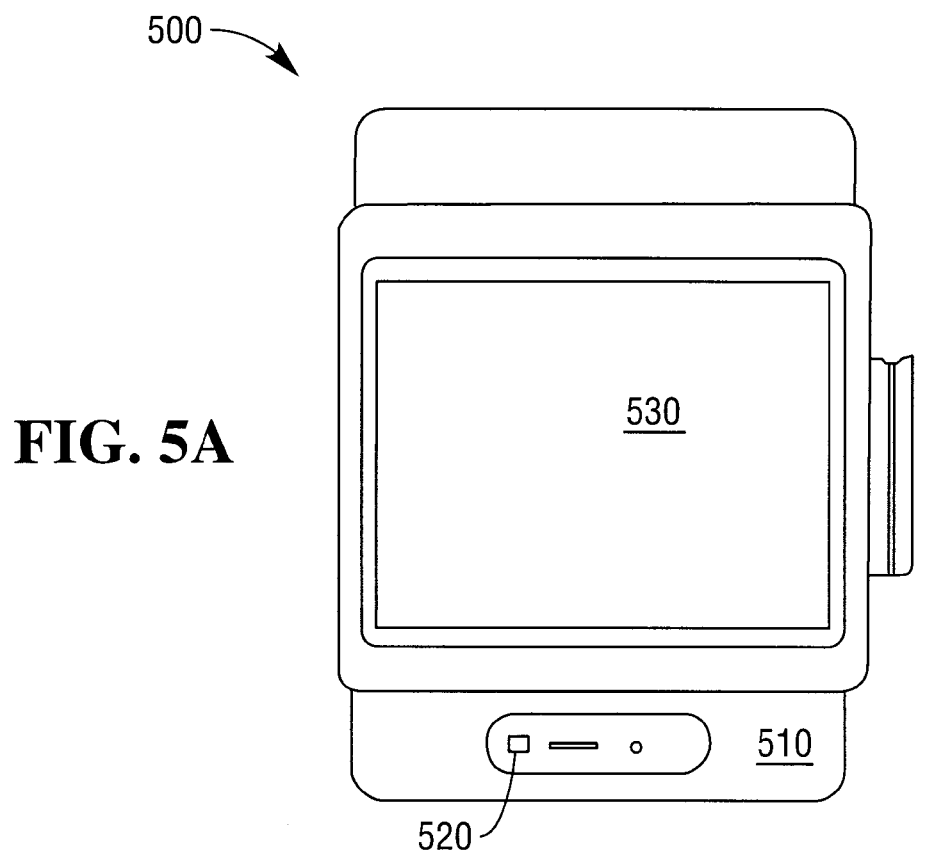
FIG. 5A illustrates an improved kiosk in accordance with the present invention.

FIG. 5A shows a kiosk 500 like the kiosk 100 which has been adapted to work with secure USB flash drives, such as the drive 400. As seen in FIG. 5A, front face 510 of the kiosk 100 now includes at least one USB port 520. The control processor (not shown) of kiosk 510 has been modified to either automatically detect insertion of the secure USB flash drive into USB port 520 and to control download of digital media, such as movies, books, music or games through the port 520. Alternatively or additionally, the control processor may drive touch panel display 530 to display a user prompt screen prompting the user to select which digital media is being employed in addition to movie trailers and other transaction related information.

Figure 5B:
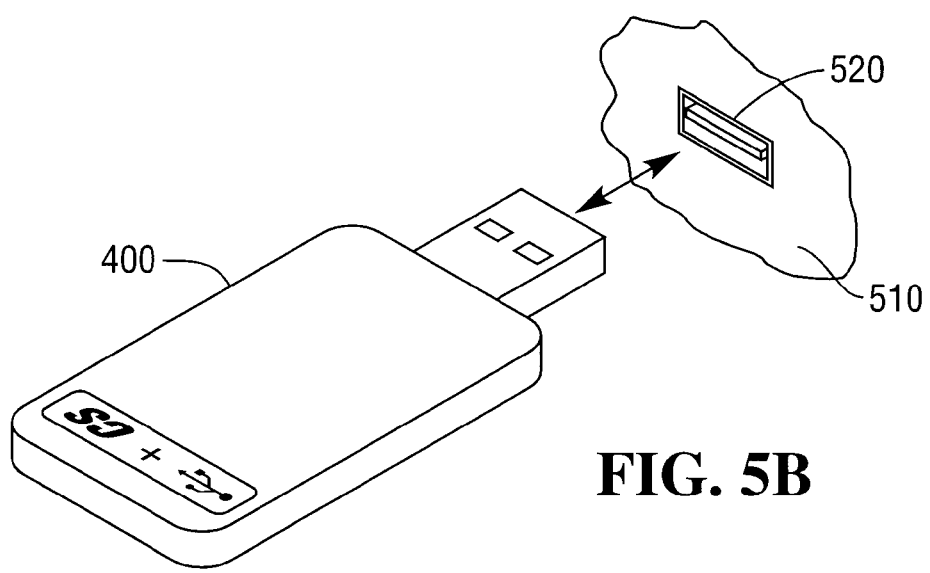
FIG. 5B illustrates a cutaway perspective view of a USB connector for the kiosk of FIG. 5A.

FIG. 5B shows a cutaway view of a portion of front face 510 illustrating the USB port 520 in greater detail. The user inserts and removes the drive 400 in a manner which is comfortable and familiar to most users.

Figure 6:
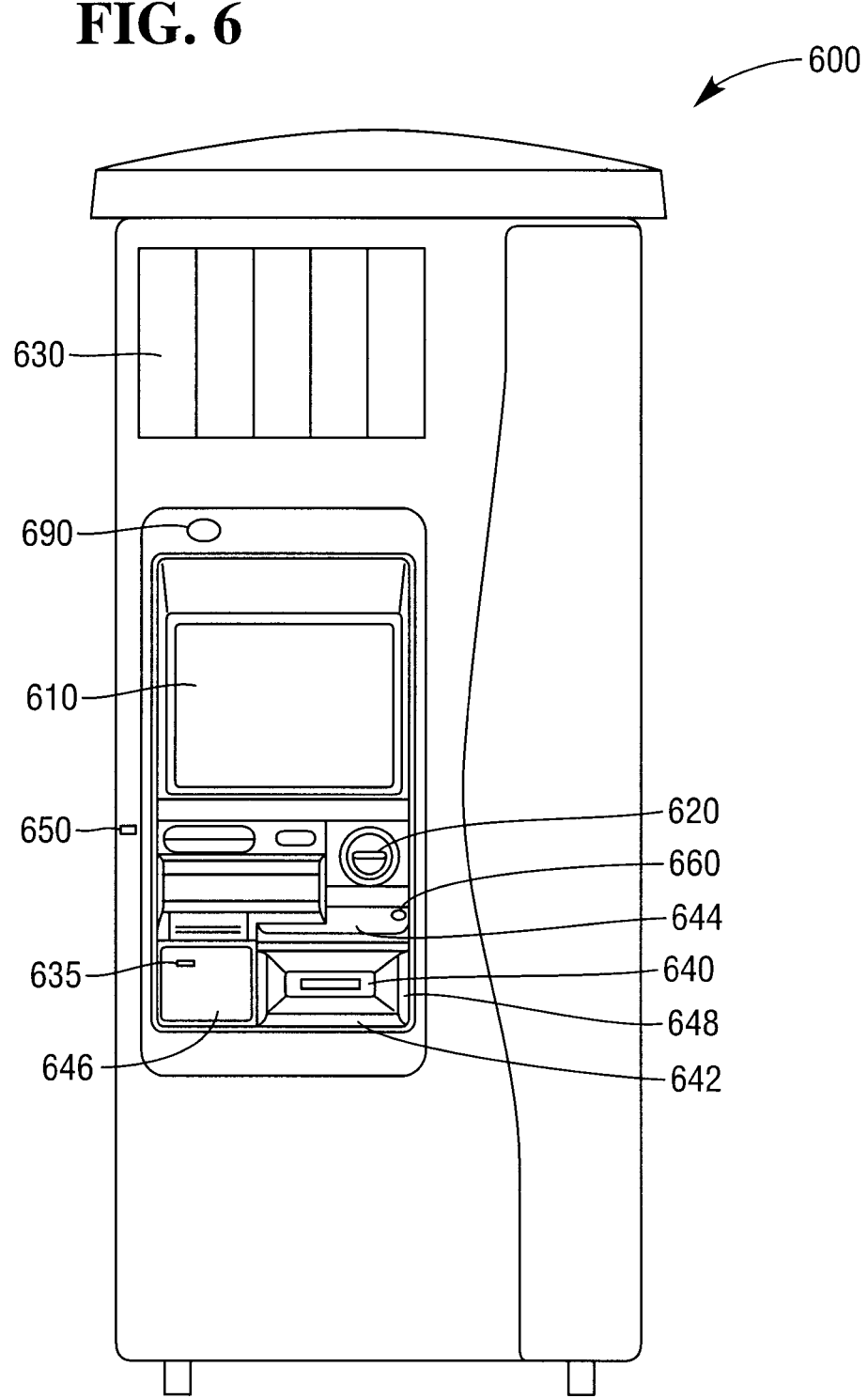
FIG. 6 illustrates a further improved kiosk in accordance with the present invention.

FIG. 6 shows a second kiosk 600 which has been adapted for use with the secure USB flash device of the present invention. Kiosk 600 may be embodied as an improvement upon an existing DVD kiosk, such as the NCR SelfServ Entertainment 2381 DVD rental kiosk.

The kiosk 600 employs a touch screen display 610, a magnetic stripe card reader 620, a display area 630 for physical display of movie promotional material or for an optional liquid crystal display (LCD) (not shown), and customer receipt slot 635 for delivery of a customer receipt printed by a receipt printer (not shown).

In general, the teachings of the present invention may be readily adapted to the operation of a wide array of existing DVD kiosks, as well as, digital download kiosks, like kiosk 100. For example, the general operation of kiosk 600 may generally follow that shown in FIGS. 28-35 and described by paragraphs [0130]-[0140] of U.S. Patent Application Publication No. 2007/0169132 published Jul. 19, 2007 which is incorporated herein in its entirety. Such operation may be advantageously modified as discussed further below.

In accordance with the present invention, a delivery and return slot 640 for delivery and return of rental DVDs and its surrounding area may suitably include return security features as discussed further herein. As seen in FIG. 1, the delivery and return slot 640 is found within the recess or entryway defined by bottom and top walls 642 and 644, and side walls 646 and 648, respectively. An RFID antenna 652 is placed above the delivery and return slot 640 and an RFID antenna 654 is placed below return slot 640. In one embodiment, the antennas 652 and 654 are embedded in the walls 642 and 644, or are located behind those walls inside the outer housing of kiosk 600. These walls are made of a plastic that does not significantly affect the antennas 652 and 654.

In addition to these RFID antennas, a gate or shutter normally closes the slot 640 to prevent access to the interior of kiosk 600 unless a DVD is sensed as properly being returned to its correct kiosk as discussed further below. In FIG. 6, the shutter is open and not visible. In the open position, a user can return a DVD to the kiosk 600 or receive a DVD therefrom.

For tracking and inventory control purposes a DVD may have an RFID chip mounted thereon. This RFID chip encodes information which when read by an RFID reader, such as a reader within the kiosk 600 can be processed to identify the DVD. Thus identified, the DVD can be matched with the customer returning it to close out a rental with the customer being charged appropriately, and for inventory control purposes, such as returning the DVD to storage and keeping track of its location therein for subsequent rental, and the like.

By including an RFID chip within or on a secure USB drive, like drive 400, and properly sensing that RFID chip, and processing the data therefrom, the shutter can be controlled to prevent secure USB drives from being returned in the DVD slot. The display 610 can be driven to guide the user, for example, by showing a picture of the relevant portion of the front of the kiosk where secure USB devices are returned, port 650, as addressed below. Alternatively, the secure USB device may be inserted into a USB connector on the exterior of kiosk 600 and an identifier may be read from secure storage thereon to confirm the device belongs to the particular kiosk 600.

In accordance with the present invention, kiosk 600 is modified to include a secure USB flash drive dispense port 650 for dispensing prerecorded secure USB flash drives, such as drive 400. Internally, a storage mechanism which might be as simple as a gravity fed stack of prerecorded secure USB flash drives which supplements the DVD inventory. Utilizing touch panel display 610, customers may select media prerecorded on secure USB flash drive devices which are then delivered to the customer at the port 650. Port 650 may be provided with its own protective shutter which is controllably opened only when a secure USB flash drive is to be delivered or returned. Upon return, a secure USB flash drive might be restacked or simply collected in a storage bin.

Because of the small form factor of secure USB flash drives in accordance with the present invention, a large number of copies of a popular movie or movies may be added by adding one or more columns of prerecorded devices. Further details of storage and delivery of such devices are described in the aforementioned U.S. patent application Ser. No. 12/974,429, filed Dec. 21, 2010 which details are incorporated by reference herein.

Figure 7:
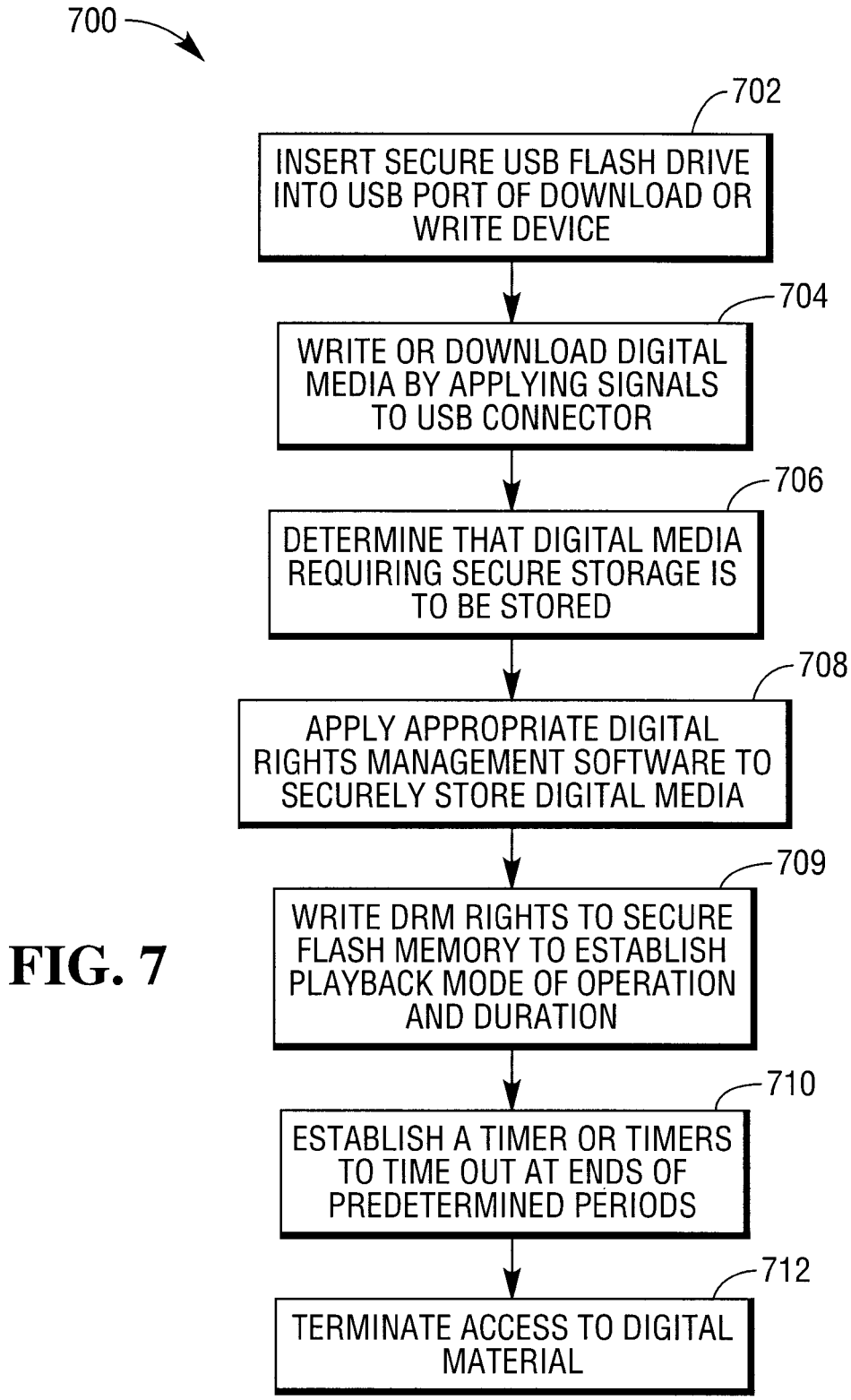
FIG. 7 shows a process of utilizing a secure USB flash drive in accordance with the present invention.

FIG. 7 illustrates a process 700 for utilizing a secure USB flash drive, such as drive 400, in accordance with the present invention. In step 702, the secure USB drive is inserted into a USB port of a download or write device. In step 704, writing or downloading of digital media is commenced by applying suitable signals to a USB connector, such as the connector 410. In step 706, a modified USB to flash memory controller, such as controller 430, detects signals being applied to the USB connector and determines that digital media, such as a movie, music, game, book or the like requiring secure storage is to be stored. In step 708, the controller writes the digital content to flash and the DRM credentials and encryption keys to secure flash storage. In a presently preferred embodiment, the controller writes the digital material encrypted utilizing CPRM and stores the encrypted digital material in flash memory, together with the DRM credentials and encryption keys in secure flash memory 420. In step 709, DRM rights are written to secure flash memory to establish playback mode of operation and duration.

In one embodiment in which the digital material comprises a movie, the user may have a predetermined period, such as thirty days to access the movie for viewing, and once accessed may have a predetermined period, such as forty-eight hours to then view the movie. Once these predetermined periods are over, access is terminated. To implement such operation, in an optional step 710, a kiosk, such as kiosk 500, sets the appropriate credentials to be stored in the secure flash storage to control the behavior of the playback operation. In step 712, after termination of the period or periods, the playback device terminates access to the digital material.

To sum up, aspects of the solutions outlined above offer the following benefits:

significantly improving usability by moving from small SD card to packaged USB device;

customer familiarity due to use of industry standard USB flash drive footprint and USB connector;

secure USB flash drive which meets the existing SD card security specification;

reduced device cost as can use slower, lower cost memory for pre-recorded and off-line downloads;

reduced device size, and only one device required, without need for an adapter; and improved customer satisfaction and familiarity.

The secure USB flash device is applicable across multiple application contexts in the entertainment line of business and presents associated licensing opportunities;

with no requirement for CPRM enabled SD card slots on consumer entertainment devices;

the USB interface is more durable and ubiquitous than SD card slots;

decoupled solutions are from the SD, SDHC and SDXC standards evolution; and the packaging of the USB device can be optimized from both a consumer and robotic handling perspective.

While the present invention has been disclosed in the context of various aspects of presently preferred embodiments, it will be recognized that the invention may be suitably applied to other environments consistent with the claims which follow.

We claim:

1. A secure universal serial bus (USB) flash drive adapted for use in download and output of digital media comprising:
    a standard USB connector for receiving digital media to be downloaded;
    a flash memory including a block of secure storage;
    a modified USB flash memory controller for storing digital media and digital rights received through the standard USB connector in the secure storage utilizing digital rights management software, and for retrieving stored digital media from the secure storage for output on the standard USB connector, the modified USB flash memory controller configured to encrypt the digital media utilizing content protection for recordable media (CPRM), the modified USB flash memory controller, the flash memory having the block of secure storage, and the standard USB connector all packaged as the USB flash drive that acts like a secure digital (SD) card.

2. The secure USB flash drive of claim 1 wherein the block of secure storage comprises a custom partitioned secure area within the flash memory.

3. The secure USB flash drive of claim 1 having an overall outer footprint like that of a standard USB flash drive.

4. The secure USB flash drive of claim 1 wherein the modified USB flash memory controller detects signals being applied to the standard USB connector and recognizes digital media requiring secure storage.

5. The secure USB flash drive of claim 4 wherein the modified USB flash memory controller stores the encrypted material in flash memory and stores digital rights management credentials in secure flash memory.

6. The secure USB flash drive of claim 5 wherein the digital media comprises a movie, music, a book, or a computer game.

7. A method of storing digital media requiring secure storage in a secure universal serial bus (USB) flash drive, the method comprising:
applying signals to a standard USB connector connected to the secure USB flash drive;
utilizing a modified USB flash memory controller to detect signals applied to the standard USB connector and determine that digital media requiring secure storage is to be stored;
encrypting the digital media by the modified USB flash memory controller, wherein encrypting the digital media further comprises implementing content protection for recordable media (CPRM) and operating the USB flash drive as a secure digital (SD) card; and
writing the encrypted digital media to flash memory and digital rights management (DRM) credentials and encryption keys to secure flash memory.

8. The method of claim 7 wherein the standard USB connector is part of a digital download kiosk, and DRM rights are established by the digital download kiosk.

* * * * *